Jan. 31, 1961  F. C. FLINT  2,970,260
APPARATUS FOR TESTING A GROUP OF ELECTRIC SIGNALS
Filed May 2, 1957  7 Sheets-Sheet 3

INVENTOR
FREDERICK CHARLES FLINT

ATTORNEYS

Fig. 6

Jan. 31, 1961 F. C. FLINT 2,970,260
APPARATUS FOR TESTING A GROUP OF ELECTRIC SIGNALS
Filed May 2, 1957 7 Sheets-Sheet 5

Fig. 7

INVENTOR
FREDERICK CHARLES FLINT
BY
ATTORNEYS

Jan. 31, 1961  F. C. FLINT  2,970,260
APPARATUS FOR TESTING A GROUP OF ELECTRIC SIGNALS
Filed May 2, 1957  7 Sheets-Sheet 6

Fig. 8

INVENTOR
FREDERICK CHARLES FLINT
BY
Fischstein, Fischstein, Ottinger
ATTORNEYS

Jan. 31, 1961   F. C. FLINT   2,970,260
APPARATUS FOR TESTING A GROUP OF ELECTRIC SIGNALS
Filed May 2, 1957   7 Sheets-Sheet 7

INVENTOR
FREDERICK CHARLES FLINT
BY
ATTORNEYS

United States Patent Office 2,970,260
Patented Jan. 31, 1961

2,970,260

APPARATUS FOR TESTING A GROUP OF ELECTRIC SIGNALS

Frederick Charles Flint, Stanmore, England, assignor to The General Electric Company Limited, Magnet House, London, England Filed May 2, 1957, Ser. No. 656,549

Claims priority, application Great Britain May 4, 1956

24 Claims. (Cl. 324—73)

This invention relates to apparatus for testing groups of electric signals.

When testing complex electronic equipment such as aircraft radar installations, it is necessary periodically to carry out a large number of routine tests in order to ensure that the equipment is operating satisfactorily. These tests may involve the measurement of a number of different parameters, for example voltage, frequency, etc. and although test sets are available that enable a small number of different parameters to be measured, say voltage and current, such test sets usually give on a meter an indication which is a measure of the appropriate parameter, the meter reading being noted by an operator.

In practice an absolute measure of the parameter of a signal under test is often not required since all that it is necessary to know is whether the parameter falls above or below a prescribed value or alternatively whether or not it falls within two prescribed values, the said value or values of the parameter defining the limit or limits of the tolerance. One object of the present invention is to provide apparatus that enables a group of electric signals that have at least two different parameters to be tested in this manner.

According to the present invention, apparatus for testing a group of electric signals which have, in the group, at least two different parameters to be tested comprises a plurality of converting means each of which is arranged to convert the value of a parameter of a signal under test into an electric test signal having a particular parameter the value of which is a measure of the said parameter of the signal under test, the said particular parameter being the same for all the converting means, and means which is responsive to a test signal supplied selectively by any one of said converting means and which is arranged to give an indication and/or effect a control in response to the value of the said parameter of a test signal supplied thereto lying to one side of a predetermined value in dependence upon the signal under test being outside the tolerance limit of the signal.

When a number of electric signals are to be measured in this manner, it is usually the case that the permissible variation in the value of the parameter (that is to say the tolerance) of each of the signals, when expressed as a percentage of the nominal value of the parameter, is not the same for all of them.

Thus according to a feature of the present invention, apparatus for testing a group of electric signals which have, in the group, at least two different parameters to be tested comprises a plurality of converting means each of which is arranged to convert the value of a parameter of a signal under test into an electric test signal having a particular parameter the value of which is a measure of the said parameter of the signal under test, the said particular parameter being the same for all the converting means, means to supply an electric check signal of which a parameter has a value which is variable and which is a measure of a limit of the tolerance of a signal under test, and means which is arranged to compare the test signal supplied by any one of said converting means with the said check signal and which is arranged to give an indication and/or effect a control in response to the parameter of the selected signal under test being outside the said tolerance.

The said check signal is thus a measure of either the low or high limit of the tolerance, the limit being variable by varying the value of the said parameter of the check signal. By providing two check signals in similar manner it is possible to determine whether the parameter of a signal under test falls between the low and high tolerance limits and it will be appreciated that these limits need not be equally spaced on either side of the nominal value of the parameter.

Thus according to a further feature of the present invention, apparatus for testing a group of electric signals which have, in the group, at least two different parameters to be tested comprises a plurality of converting means each of which is arranged to convert the value of a parameter of a signal under test into an electric test signal having a particular parameter the value of which is a measure of the said parameter of the signal under test, the said particular parameter being the same for all the converting means, means to supply two electric check signals of each of which a parameter has a value which is variable and which, in respect of one of the check signals, is a measure of the low tolerance limit of the signal under test while, in respect of the other check signal, is a measure of the high tolerance limit of the signal under test, and means which is arranged to compare the test signal supplied by any one of said converting means with the two check voltages and which is arranged to give an indication and/or effect a control in response to the parameter of the selected signal under test being outside the tolerance defined by the said limits.

If, for example, one of the said converting means is arranged to derive a direct current signal the voltage of which is proportional to the frequency of an oscillatory signal supplied to that means, then that converting means may be used to derive the test signal in respect of all those electric signals in the said group in respect of which the parameter to be tested is frequency. Preferably, therefore, at least one converting means is arranged to be utilised for testing two or more signals of the said group.

In respect of one or more of the signals to be tested, the appropriate parameter to be tested may be the said particular parameter and in that case, the arrangement may be such that the test signal supplied to the said means which is arranged to compare the test signal with the check signal or signals in respect of that signal to be tested, or each of those signals, is obtained without the use of converting means for changing from one parameter to another.

According to yet another feature of the present invention, apparatus for testing a group of electric signals which have, in the group, at least two different parameters to be tested comprises a plurality of means which are arranged to change the levels of at least some of the electric signals forming the group to be tested and which are each associated with one test (if a signal has more than one parameter to be tested then there may be more than one of these means associated with that signal), a plurality of converting means each of which is arranged to convert the value of a parameter of a signal of the said group after passing through the appropriate last mentioned means (where applicable) into a direct current test signal having a voltage the value of which is a measure of the said parameter, first switching means arranged selectively to connect the said plurality of converting means in circuit so as, during operation, to derive a test signal in respect of only one of the electric signals of the said group at a time, means to supply a first plurality of different check voltages, second switching means to select any one of the said first plurality of check voltages, means to supply a second plurality of different check voltages, third switching means to select any one of the said second plurality of check voltages, and means which is arranged to compare the test signal voltage with the two check voltages selected by the second and third switching means and which is arranged to give an indication and/or effect a control in response to the test signal voltage being outside the voltage range the limits of which are equal to the two check voltages.

The first switching means may be arranged so that in respect of some of the signals of the said group the test signal is obtained directly from the said level changing means, that is to say without the use of converting means. Preferably the first, second and third switching means are arranged to be operated together so that when the parameter of a particular signal of the said group is under test the appropriate check voltages which are a measure of the low and high tolerance limits of the parameter are automatically selected. The first, second and third switching means may comprise different banks of a step-by-step electromagnetic switch. The arrangement may be such that the apparatus tests the whole group of electric signals sequentially at least until such time as one is found that lies outside its predetermined tolerance, the switching means being arranged to set up automatically the necessary connections for the next test after one test has been completed. Alternatively, or in addition, there may be means to enable any particular test to be carried out, that is to say without having to test all the signals in the group in sequence before the particular test is reached.

One example of apparatus in accordance with the present invention for testing an aircraft radar installation will now be described with reference to the ten figures of the accompanying drawings in which.

The apparatus to be described is capable of being taken from aircraft to aircraft so that the similar installations of a number of aircraft can be tested in turn.

The various signals that are to be tested are taken from junction boxes that form part of the radar installation and the signals are fed to the testing apparatus over suitable leads which are preferably multi-conductor cables. The apparatus is arranged to test the several signals in sequence.

Figure 1:
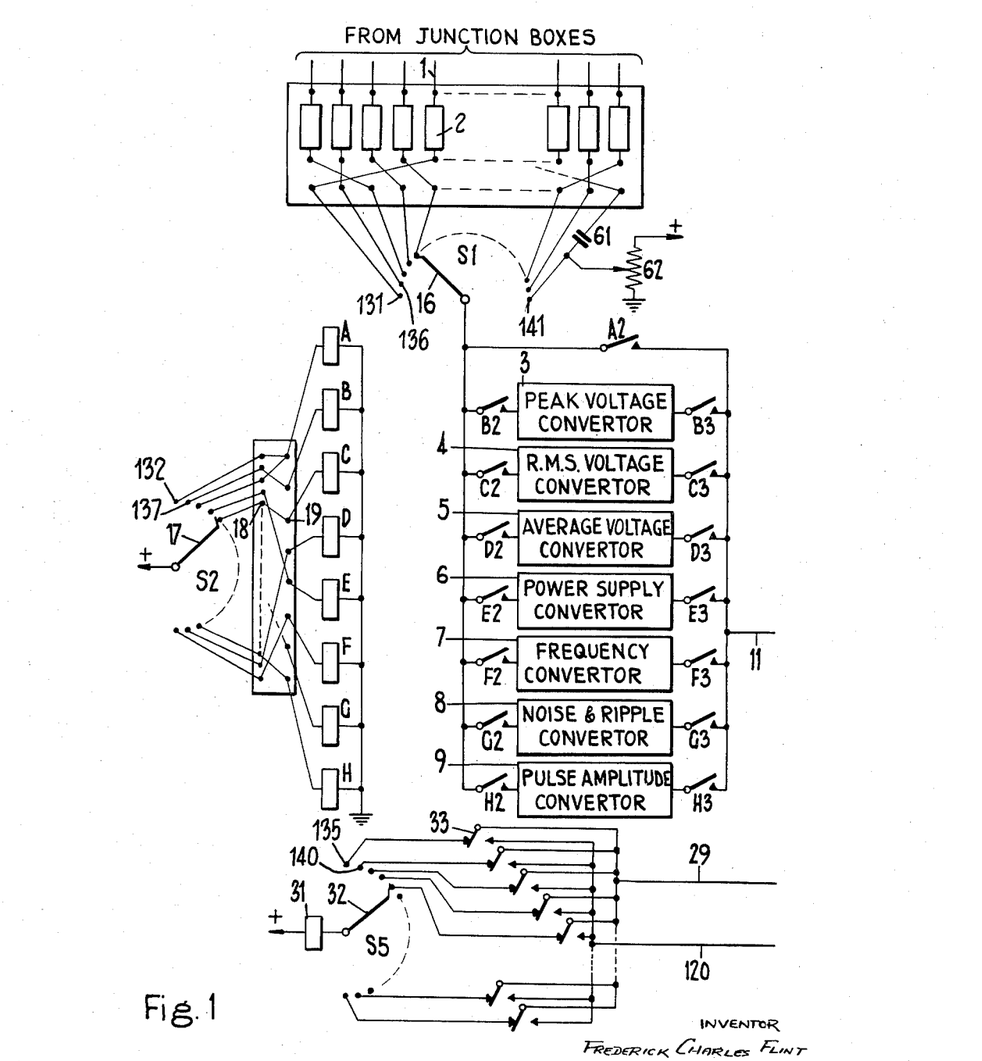
Figures 1 and 2 show the apparatus diagrammatically, the complete diagram of the apparatus being obtained by laying these two figures side by side with Figure 2 to the right of Figure 1, Figures 3 to 10 show in more detail the circuits of those parts of the apparatus that are shown as blocks in Figures 1 and 2.
Figure 2:
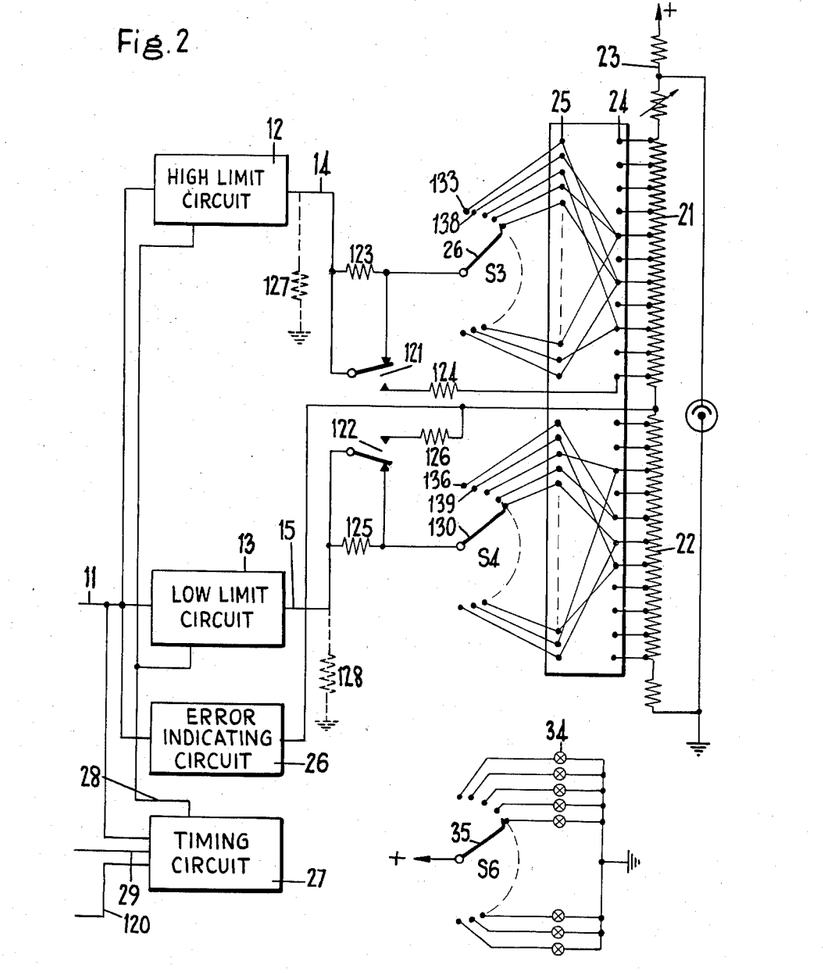

Considering first, with reference to Figures 1 and 2 of the accompanying drawings, the general method of testing each of the signals which is supplied to the apparatus over the appropriate lead 1, it is first passed through an attenuator 2 which may be associated with a filter and which is individual to that particular lead, to one of seven converting means 3 to 9 which is arranged to convert the value of the particular parameter of the signal into a direct current test signal having a voltage the value of which is a measure of the said parameter. (In a small number of tests no attenuator, such as the attenuator 2, is required while in other tests none of the converting means 3 to 9 are used. These tests will be described more fully hereinafter.) Each of the converting means 3 to 9 may be used for testing more than one signal and the attenuator (where appropriate) and converting means together are arranged so that a signal under test produces a direct current test signal having a voltage that is nominally +10 volts. This test signal which is fed over a path 11 is then compared with two variable check voltages that are a measure of the low and high tolerance limits respectively of the signal under test, two circuits 12 and 13 (hereinafter referred to as the "high limit circuit" and the "low limit circuit" respectively) being provided for this purpose. The check voltage supplied to the high limit circuit 12 over a lead 14 is above +10 volts while the check voltage supplied over lead 15 to the other circuit 13 is below +10 volts.

The necessary connections for bringing the converting means 3 to 9 into use and for varying the two check voltages supplied over the leads 14 and 15 is effected by means of a step-by-step electromagnetic switch, the six contact banks of which are references S1 to S6 respectively in the drawings. This switch has twenty-five positions, each corresponding to one test, and the several signals to be tested are fed each to one contact of the bank S1 after passing through the appropriate attenuator 2 and filter (if provided).

Seven electromagnetic control relays B to H are associated with the converting means 3 to 9 respectively and one pair of normally open contacts of each of these relays, for example the contacts C2, is arranged to connect the wiper 16 of the switch bank S1 to the input terminal of the appropriate converting means 3 to 9 while another pair of normally open contacts, for example the contacts C3, is arranged to connect the output terminal of that converting means to the common test path 11. A further control relay A has a pair of normally open contacts A2 connected directly between the wiper 16 of the bank S1 and the test path 11.

The wiper 17 of the switch bank S2 is connected to a positive voltage source and each of the contacts of this bank is connected to an associated terminal 18 which is cross-connected to one of a smaller number of terminals 19 which are associated one with each of the relays A to H. In fact, the operating winding of each of the relays A to H is connected between one of the terminals 19 and earth so that for each position of the step-by-step switch one and only one of the control relays A to H is operated. In other words, for each position of the switch one of the converting means 3 to 9 is connected in circuit or alternatively there is a direct connection between the wiper 16 of the switch bank S1 and the test path 11.

As already mentioned there are seven converting means 3 to 9 in the apparatus under consideration and each of these means converts the value of a parameter of a signal under test to a direct current signal having a nominal +10 volts. The parameters handled by the converting means 3 to 9 are listed below:

Converting means:
- 3 — Peak alternating voltage.
- 4 — R.M.S. alternating voltage.
- 5 — Average alternating voltage.
- 6 — Power supplies.
- 7 — Frequency.
- 8 — Peak-to-peak noise and ripple on power supply lines.
- 9 — Pulse amplitude.

Each of the two check voltages may have any one of eleven values, two tapped resistors 21 and 22 being connected in series for this purpose as part of a potentiometer chain that is connected between the positive side 23 of a stabilised direct current supply and earth. The eleven tapping points on the resistor 21 are each connected to a corresponding terminal 24 and these eleven terminals 24 are cross-connected to terminals 25 that are each connected to one contact of the bank S3 of the said switch. The arrangement is such that the junction of the two tapped resistors 21 and 22 is accurately maintained at a voltage of +10 volts while the tappings on the resistor 21 are arranged so that the voltages thereat are 1%, 2%, 3%, 5%, 10%, 15%, 20%, 30%, 40% and 50% above +10 volts. One of the check voltages is thus supplied by the wiper 26 of the switch bank S3 and this voltage may, therefore, have any one of eleven values between +10.1 and +15 volts.

The fourth contact bank S4 of the said switch is similarly connected to the other tapped resistor 22 so as to provide the other check voltage which may, therefore, have any of the previously mentioned percentages below +10 volts, that is to say between +9.9 and +5.0 volts.

An error indicating circuit 26 is arranged to indicate the deviation of the voltage on the path 11 from 10 volts.

In order to permit transients to die away, the period of time necessary for making any particular test depends on the converting means 3 to 9 that is connected in circuit for that test and acordingly a timing circuit 27 is provided. At the end of the timed period, which is dependent upon which of the relays A to H is operated, a testing pulse (which may have a duration of, say 40 milli-seconds) is fed over a path 28 to the two limit circuits 12 and 13 and, if the voltage on the test path 11 is then between the two check voltages, a lead 29 is earthed for a short period (which may have a duration of, say, 20 milli-seconds so as to cause the step-by-step switch to be moved on to its next position as hereinafter described. If, however, the voltage on the test path 11 is outside the check voltages, a visual indication is given and/or an alarm is sounded and the step-by-step switch remains in the position of the faulty test.

The operating winding 31 of the stepping electromagnet of the said switch is connected between the wiper 32 of the contact bank S5 of the switch and a positive supply and the contacts of this bank are connected each through an associated switch 33, the significance of which will be explained hereinafter, to the path 29.

Thus at the beginning of a series of tests the step-by-step switch is operated so that the wipers 16, 17, 26, 130 and 32 are in contact with the first contacts 131, 132, 133, 134 and 135 of the banks S1 to S5 respectively. With the step-by-step switch in this position, the operating circuit of the relay A is completed by way of the contact 132 and the wiper 17 with the result that the relay A is operated. The voltage on the lead 1 is therefore passed through the attenuator 2 and then by way of the contact 131, the wiper 16 and the closed relay contacts A2 to the path 11. The check voltages supplied to the high limit circuit 12 and the low limit circuit 13 by way of the wipers 26 and 130 respectively are compared by those circuits with the voltage on the path 11 at the end of a timed period. The switch is then automatically stopped on one position so that the wipers S1 to S5 are then in contact with the contacts 136 to 140 respectively thereby setting up in similar manner the necessary connections for testing the peak voltage of the second signal. After the appropriate time interval this signal is tested and the switch is stepped to its third position and so on.

Each of the contacts of the sixth bank S6 of the said switch is connected through an associated pilot lamp 34 to earth while the wiper 35 of this bank is connected to a positive supply. Thus when any test is being carried out, the appropriate lamp 34 is lit.

Figure 3:
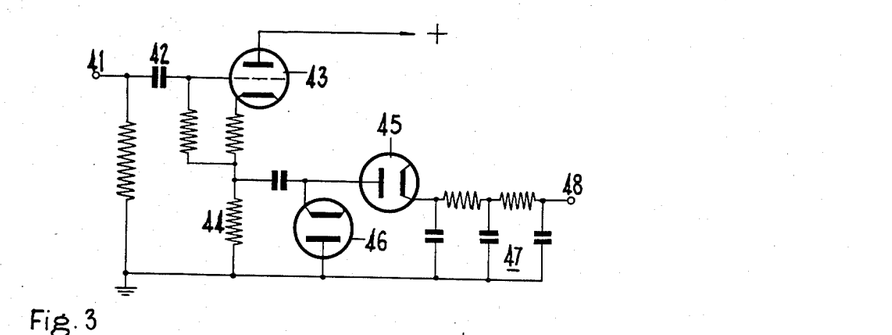

Parts of the apparatus that are shown in Figures 1 and 2 as blocks will now be described in more detail. Considering first the converting means 3 to 9, the circuit of the means 3 is shown in Figure 3. The signal applied to the input terminal 41 of this means is fed through a capacitor 42 to the control grid of a triode thermionic valve 43 which is arranged as a cathode follower stage. The signal developed across the resistor 44 in the cathode circuit of the valve 43 is rectified by means of two diode valves 45 and 46 and then passed to smoothing network 47 so as to derive at the output terminal 48 a unidirectional voltage which is proportional to the peak-to-peak voltage of the input signal applied to the terminal 41.

Figure 4:
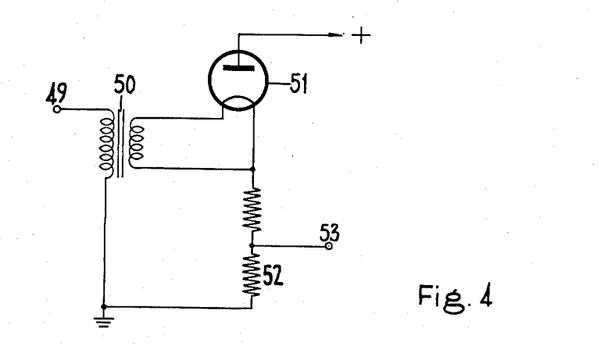

Figure 4 shows the circuit of the converting means 4 and in this case the signal applied to the input terminal 49 is passed through a transformer 50 and utilised to provide the heater current for a directly heated thermionic diode valve 51. The diode valve 51 is chosen so that under the required operating conditions its anode current is dependent upon the R.M.S. voltage of the heater current supplied thereto and a suitable valve is the Mazda type 29C1. The unidirectional voltage developed across a resistor 52 in the cathode circuit of the diode 51 is fed to the output terminal 53 of this circuit.

Figure 5:
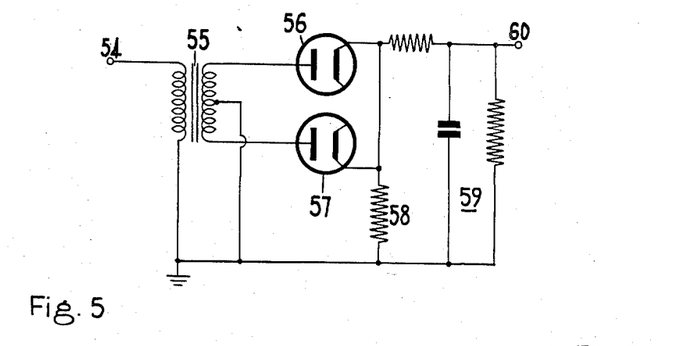

In Figure 5, which shows the circuit of the converting means 5, the signal applied to the input terminal 54 is passed through a transformer 55 to a pair of diode thermionic valves 56 and 57, these diode valves 56 and 57 having a common cathode load resistor 58 and being arranged so that one of them is conducting during each half cycle of the alternating current signal supplied to the input terminal 54. The voltage developed across the resistor 58 is smoothed by means of the network 59 so as to derive at the output terminal 60 a unidirectional voltage which is proportional to the average voltage of the input signal applied to the terminal 54.

The circuit of the converting means 6 is shown in Figure 2 of copending United States patent application Serial No. 656,528, filed May 2, 1957. When carrying out a test using the converting means 6 the signal supplied thereto through the switch bank S1 for the purpose of checking a plurality of electric supplies consists of a direct current component and two alternating current components having frequencies of 400 to 1600 cycles per second. This signal is fed to the converting means 6 from the appropriate lead 1 via the switch bank S1 without passing through any attenuator 2 or filter. This means 6 provides two direct current output signals which each has a nominal value of 10 volts when the supplies being checked are all present. One of these output signals is in respect of the direct current supplies being checked while the other is in respect of the alternating current supplies. Since the apparatus described in the present specification is only capable of carrying out one test at a time, two tests are necessary and the appropriate two contacts of the bank S1 are connected together. The converting means 6 is provided with a further control relay which is arranged for each of the two tests to select the appropriate one of the two output signals and to pass it to the output terminal of the means 6 and thus to the test path 11, the operating winding of this further relay being connected in similar manner to the relays A to H (in Fig. 1) to one of the terminals 19.

The converting means 7 is arranged to convert the frequency of an oscillatory signal into a unidirectional voltage which is a measure of the nominal value of that frequency. In fact when using the converting means 7, the signal fed to each appropriate contact of the switch bank S1 has a direct current component superimposed thereon, the voltage of this component being a measure of the nominal frequency of the appropriate signal to be tested. In Figure 1, the last position of the step-by-step switch is assumed to correspond to a test in which the frequency of an oscillatory signal is tested and the direct current component appropriate to this test is supplied to contact 141 of the bank S1 by means of the capacitor 61 and the potentiometer 62. It will be appreciated that the potentiometer 62 is individual to one test and accordingly if a number of different frequencies are to be tested, this can be done by adjusting each of the potentiometers corresponding to the potentiometer 62 so as to provide for each test a direct current component which is added to the signal to be tested and which has a voltage that is a measure of the nominal frequency of that signal.

Figure 6:
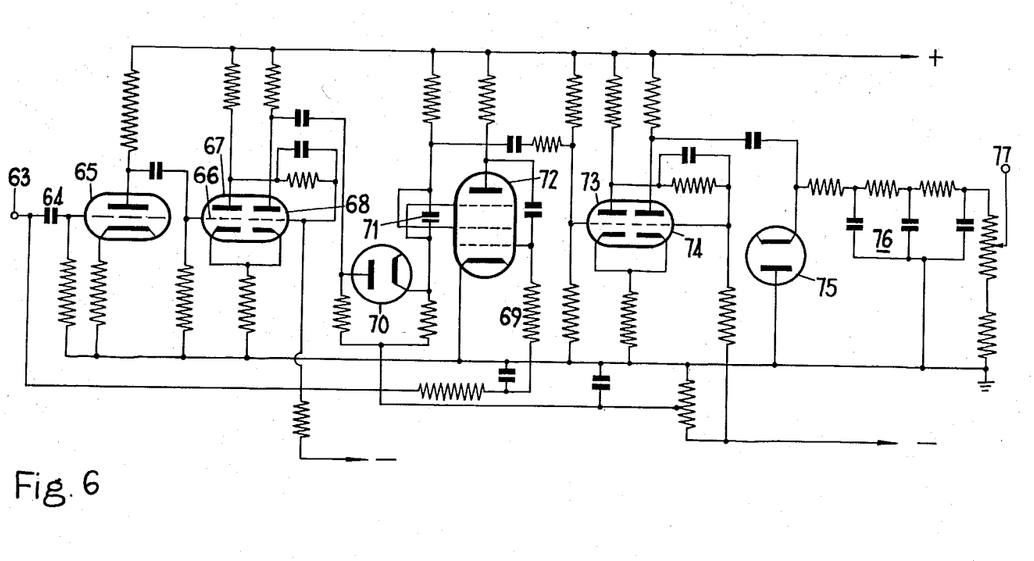

Referring now to Figure 6 of the accompanying drawings, the signal applied to the input terminal 63 consists, as stated above, of an oscillatory component the frequency of which is to be tested and a direct current component the voltage of which is a measure of the nominal value of that frequency. The oscillatory component is fed through a capacitor 64 to the control grid of a triode thermionic valve 65 which is arranged as an amplitude limiter so that the signal passed on to the triode portion 66 of a double triode valve 67 has an approximately square waveform. The valve 67 is arranged as a Schmitt trigger circuit in which the triode portion 66 is normally conducting and the triode portion 68 is normally cut-off.

Upon the occurrence of each negative-going excursion of the waveform of the signal passed by the valve 65, the triode portion 66 is cut-off and the triode portion 68 conducts. Subsequently, upon the occurrence of a positive-going excursion of the said waveform, the trigger circuit reverts to the condition with the triode portion 66 conducting and the triode portion 68 cut off. The anode voltage of the triode portion 68 is differentiated and each positive-going pulse of the resulting waveform is selected by means of a diode valve 70 and fed to the suppressor grid of a pentode thermionic valve 72.

The valve 72 is connected in a Miller-transitron circuit and the electron flow to the anode of this valve is normally cut-off by the suppressor grid bias although anode current is caused to flow when the suppressor grid voltage is increased in the manner just stated. The Miller-transitron circuit including the valve 72 operates in known manner so that, after anode current has been switched on by pulsing the suppressor grid, anode current continues to flow for a predetermined period after which the circuit is returned to the condition with the negative bias on the suppressor grid preventing the electron flow in the valve from reaching the anode.

The signal developed at the screen grid of the valve 72 has a rectangular waveform and this signal is fed to a double triode valve 73 which is arranged to act as a Schmitt trigger circuit. The signal passed by the triode portion 74 of the double triode valve 73 has a substantially rectangular waveform, each positive-going pulse lasting for a period equal to that during which the anode current of the valve 72 is caused to flow as aforesaid.

It will be appreciated that the period during which the anode current of the valve 72 flows during each cycle of the input oscillatory signal is dependent upon the voltage to which the control grid of that valve is returned via the resistor 69. This voltage is, however, provided by the direct current component of the signal applied to the input terminal 63 and accordingly it follows that the mark/space ratio of the pulse signal passed by the triode portion 74 of the double triode valve 73 is a measure of the deviation of the frequency being tested from its nominal value. This pulse signal is subjected to a clamping action by means of a diode valve 75 and is then smoothed by the network 76 to provide the required output signal at the terminal 77.

The frequency converting means 7 is arranged to cover a range of, say, 100 cycles per second to 2 kilocycles per second and although in the above description the input signal is referred to as being oscillatory, the converting means 7 is capable of handling an input signal having either a sinusoidal or pulse waveform.

The means 8 for converting peak-to-peak noise and ripple on supply lines is capable of handling an input signal of the order of 10 millivolts having a frequency range of approximately 200 cycles per second to 10 kilocycles per second. The circuit of this means 8 comprises a high gain amplifier followed by a peak-to-peak detector.

Figure 7:
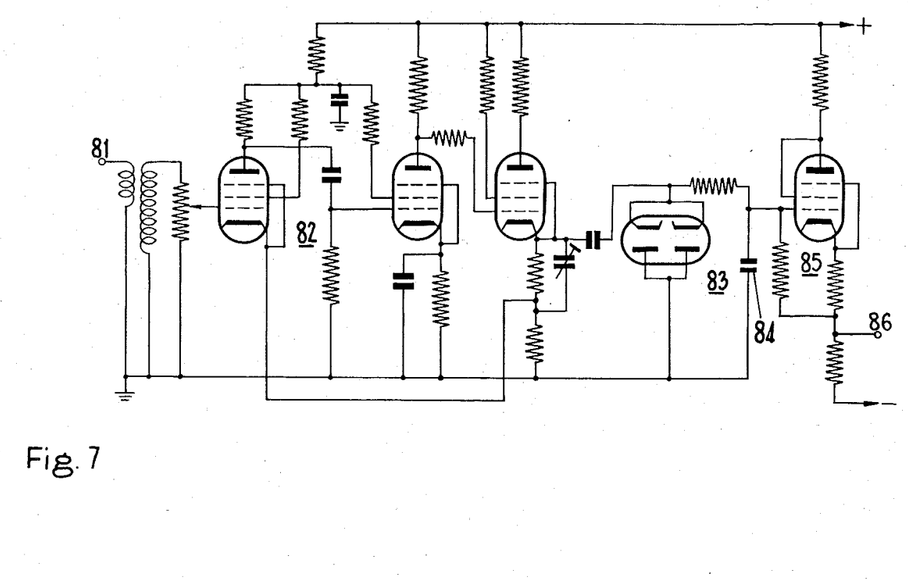

The pulse amplitude converting means 9 is capable of handling input signals in the form of trains of pulses which may vary in width from 0.5 to 8.0 microseconds. Since attenuator pads are provided in the said radar junction boxes for the purpose of attenuating the pulse signals, it is necessary for this means to include an amplifier. Thus referring to Figure 7 of the accompanying drawings, the pulse signal applied to the input terminal 81 is passed through a three-stage amplifier 82, this amplifier having a relatively wide bandwidth, say 50 cycles per second to 12 megacycles per second, so as to prevent distortion of the pulse signals supplied thereto. The amplifier 82 is followed by a peak voltage detector 83 and the voltage developed across the capacitor 84 is passed through a cathode follower stage 85 to the output terminal 86.

The converting means 9 may be adapted so that it is capable of supplying an output signal that is either a measure of the amplitude of the pulses supplied thereto or the width of those pulses. This may be effected by switching between the output of the amplifier 82 and the peak detector 83 a circuit for deriving a pulse signal the amplitude of which is directly proportional to the width of the pulses passed by the amplifier 82. This switching may be effected by means of an additional control relay which is connected in similar manner to the control relays A to H (Figure 1).

It will, of course, be understood that other converting means may be provided. Moreover for some tests, it may be convenient for two or more of the converting means 3 to 9 to be connected in cascade and an additional control relay or relays may be provided to set up the appropriate connections when the wiper 17 of the switch bank S2 completes the operating circuit for this relay or relays.

It will be appreciated that the converting means 4 as described above, for example, is only capable of deriving a voltage that is a measure of the R.M.S. alternating voltage on a single one of the leads 1 with respect to earth. If, however, it is desired to test the R.M.S. voltage between two of the leads 1, these two leads are connected to the corresponding contacts of two different banks of the step-by-step switch while the wipers of these two banks are arranged to be connected through contacts of the appropriate control relay to two input terminals of the converting means 4. In this case the primary winding of the transformer 50 (Figure 4) is connected between these two input terminals.

Similarly if the parameter to be measured in any particular test is in respect of a three-phase alternating current supply, these connections may be made to the appropriate converting means by way of three banks of the step-by-step switch. Alternatively these connections to the converting means may be made by a 3-pole relay without passing through any contact banks of the said switch, this relay being connected in similar manner to the control relays A to H.

Figure 8:
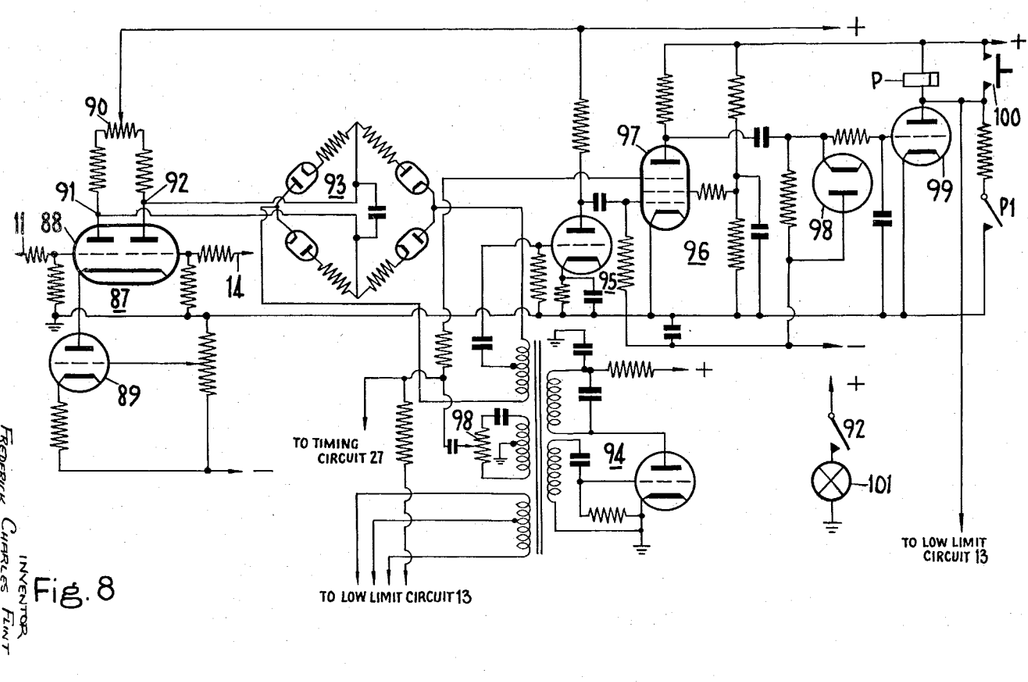

Considering now the high limit circuit 12 which is shown in Figure 8, the test signal and the check voltage supplied over the test path 11 and the lead 14 respectively are compared by means of a differencing amplifier 87. This amplifier 87 is formed by a double triode thermionic valve 88 and a triode valve 89 is connected in the common cathode circuit of the valve 88 so as to regulate the total anode current of the valve 88. A potentiometer 90 is adjusted so that the difference between the voltages developed at the points 91 and 92 is proportional to the difference between the voltages on the path 11 and lead 14. The voltage developed between the points 91 and 92 is applied to a ring modulator 93 of the Cowan type which is arranged to modulate the voltage difference on to an oscillation having a frequency of, say, 5 kilocycles per second which is supplied by an oscillator 94. The modulated oscillation is passed through an amplifier stage 95 to a phase sensitive detector 96 which is provided by a pentode thermionic valve 97. In fact, the modulated oscillation is supplied to the control grid of the valve 97 while a reference oscillation which is in phase with the oscillation supplied to the modulator 93, is supplied to the suppressor grid of the valve 97. The correct phasing of this reference oscillation is obtained by adjustment of a potentiometer 98. The reference oscillation causes the pentode valve 97 to be conducting only during alternate half cycles and the signal passed thereby is rectified by a diode valve 98 and the resulting unidirectional voltage is utilised to bias a triode thermionic valve 99 which has the operating winding of an electromagnetic relay P in its anode circuit.

The arrangement of the high limit circuit is such that when a test is being made, the valve 99 is biased so that the relay P is only operated if the difference between the voltages on the paths 11 and 14 has a value greater than a predetermined value, say 5 milli-volts, and has a particular sense. Since the bias supplied to the triode valve 99 as a result of any particular test only lasts for a relatively short period, normally open contacts P1 are connected in a holding circuit so that once the relay P is operated it remains in that condition until contacts 100 are bridged, for example by pressing a restart push-button (not shown). Contacts P2 are connected in circuit with a pilot lamp 101 which is thus lit when the relay P is operated. As will be explained hereinafter, operation of the relay P causes the sequence of tests to stop while additional contacts of that relay may be connected in the operating circuit of an electric bell or other alarm.

The low limit circuit 13 is generally similar to the high limit circuit 14 described above with reference to Figure 8 although it will be understood that the same oscillator 94 is used with both limit circuits. In the case of the low limit circuit, the reference oscillation supplied to the suppressor grid of the valve corresponding to the valve 97 in the high limit circuit is in anti-phase with the oscillation supplied to the modulator 93. Furthermore the operating winding of the relay P is arranged to carry the anode current of both the valve 99 and the corresponding valve of the low limit circuit so that the relay P is caused to be operated if the parameter being tested deviates from its nominal value by more than the tolerances indicated by the check voltages supplied over the leads 14 and 15.

Alternatively each of the limit circuits 12 and 13 may comprise a switch, provided either by an electronic circuit or relay contacts arranged to supply a valve amplifier alternately and for equal periods with the voltage on the test path and with the appropriate check voltage. The switching frequency may be 100 cycles per second and the amplitude of the resulting alternating current signal is proportional to the difference between the voltage on the test path and the check voltage while the phase of the signal is a measure of the sense of the voltage difference. The amplified alternating current signal is passed to a phase sensitive detector which may be a further switch which operates synchronously with the previously mentioned switch to produce, after smoothing, a unidirectional voltage which is a measure of the amplitude and sense of the said voltage difference. This unidirectional voltage is utilised to control the relay P as mentioned above.

Figure 9:
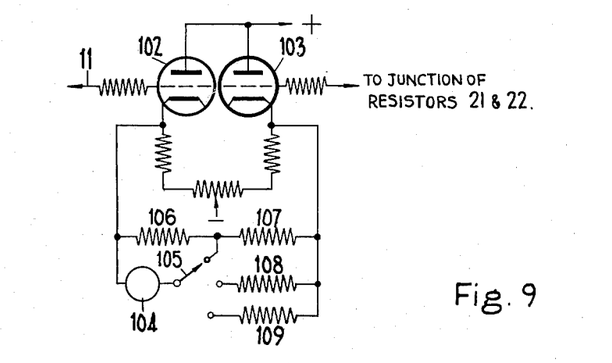

Referring now to Figure 9 the error indicating circuit 26 (Figure 1) comprises two triode valves 102 and 103 to the control grids of which are supplied the voltages on the test path 11 and the voltage developed at the junction of the resistors 21 and 22 respectively. The valves 102 and 103 are arranged as cathode follower stages and the difference between the cathode voltages of the two valves is arranged to be measured by an indicating meter 104. A three-position switch 105 is arranged to connect resistors 106 to 109 in circuit for the purpose of varying the range of the meter 104. In the position of the switch 105 shown in Figure 9 full scale deflection of the meter 104 corresponds to 100% deviation of the voltage on the test path 11 from 10 volts while in the other positions of the switch 105 full scale deflection of the meter 104 corresponds to deviations of 25 and 5% respectively. Thus by means of the meter 104, it is possible to read off the percentage error of a parameter being tested from its nominal value.

Figure 10:
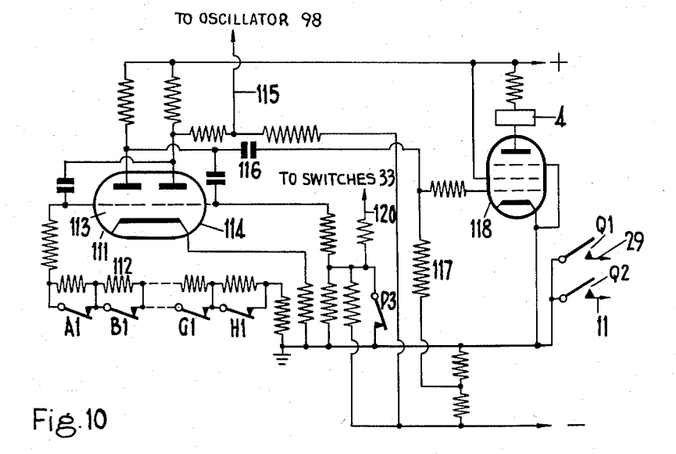

The timing circuit 27 of Figure 1 is shown in more detail in Figure 10 of the accompanying drawings. A double triode thermionic valve 111 is connected as a free-running multivibrator. A plurality of resistors 112 are associated each with one of the contacts A1 to H1 of the control relays A to H so that for any test, one of the resistors 112 is connected in the multivibrator circuit.

At the beginning of each timing cycle the triode portion 113 of the valve 111 is cut off and the triode portion 114 is conducting. This is one of the two stable conditions of the multivibrator and lasts for a period which is determined by the value of the particular resistor 112 that is connected in circuit, this period depending on the particular converting means 3 to 9 that is being used for the test. At the end of this period the triode portion 113 becomes conducting and the triode portion 114 is cut off with the result that a positive-going pulse is supplied over the lead 115 for the purpose of biassing the suppressor grid of the valve 97 (Figure 8). In the absence of this bias the valve 97 is non-conducting so that no test can be made.

Subsequently the multivibrator reverts to the condition in which the triode portion 113 is cut off. The anode voltage of the triode portion 113 is differentiated by means of the capacitor 116 and resistor 117 and the resulting signal is supplied to the control grid of a pentode thermionic valve 118 which is normally non-conducting. Upon the triode portion 113 becoming again non-conducting, that is to say at the end of the positive-going pulse supplied over the lead 115, a positive-going pulse is thus fed to the control grid of the valve 118 with the result that the relay Q which has its operating winding connected in the anode circuit of that valve, is operated. Closing the normally open contacts Q1 causes the lead 29 to be earthed for the purpose of operating the step-by-step switch so as to set up the necessary connections for the next test. Similar closure of the normally open contacts Q2 applies an earth to the test path 11.

If, however, after the application of the positive-going pulse over the lead 115 as aforesaid, the relay P (Figure 8) is operated as a result of the parameter of the signal under test lying outside the specified tolerance limits, normally closed contacts P3 are opened so as to cause a negative voltage to be fed to the control grid of the triode portion 114 of the multivibrator valve 111. It will be appreciated that during the period of test the triode portion 114 is in fact already cut off but the application of this voltage upon the contacts P3 opening ensures that the multivibrator does not change over to its other condition and accordingly the relay Q is not operated. In other words the sequence of testing is then stopped with the appropriate lamp 34 (Figure 2) lit. For the purpose of restarting the sequence, it is necessary to cause the multivibrator formed by the valve 111 to change over to its other stable condition for the purpose of operating the relay Q. This automatically occurs when the relay P is released upon the contacts 100 being bridged.

As so far described, the apparatus is arranged so that when a test is being carried out the voltage on the test path 11 is always nominally +10 volts. The apparatus may however be extended so that the nominal test path voltage is either −10 or +10 volts. For this purpose it is necessary to be able also to supply check voltages to the two limit circuits 12 and 13 over the leads 14 and 15 that have the required tolerances on either side of −10 volts. This may be effected by means of two further tapped resistors that are connected in series between earth and the negative side of a stabilised direct current supply in similar manner to the resistors 21 and 22.

Alternatively only the two tapped resistors 21 and 22 may be provided for supplying check voltages on both sides of either −10 or +10 volts. In this case the two resistors are connected in series as part of a potentiometer that is connected across a stabilised direct current supply while contacts of a relay are arranged to switch the polarity of the supply lines that are connected to the ends of the potentiometer. This relay is arranged to be operated automatically, the operating winding thereof being connected in circuit with additional contacts of some of control relays A to H for example, so that check voltages of the correct polarity are supplied over the leads 14 and 15 for each test.

Returning again to the apparatus under consideration, each of the change-over switches 33 that is connected in circuit with the contacts of the switch bank S5 is provided with an associated push-button (not shown), the switches 33 being normally in the positions shown in Figure 1. When one of these buttons is depressed the appropriate switch 33 is changed over to its other position. Under these conditions the multivibrator formed by the valve 111 (Figure 9) operates at its highest frequency, say 15 cycles per second, since none of the contacts A1 to H1 are open, the control relays A to H being slow-to-operate. Thus the relay Q is operated at this frequency and at each such operation the step-by-step switch is moved on one step due to the lead 29 being earthed. Each time the relay Q releases, the operation of the multivibrator continues provided the wiper 32 of the switch bank S5 is not connected to a contact of that bank to which is connected a switch 33 of which the associated push-button has been pressed. The reason for this is that, by virtue of the connection through the switch bank S5 and one of the switches 33 which is in the position shown in the drawing, a bias is supplied to the control grid of the triode portion 114 to cause it to conduct whether or not the relay P is operated. When however the step-by-step switch is moved to the position in which the operating winding 31 of the step-by-step switch is connected in circuit with one of the switches 33 of which the associated push-button has been pressed, the next operation of the relay Q does not complete the energizing circuit of the winding 31 while the lead 120 is then earthed so that the triode portion 114 of the valve 111 is cut off. The voltage on the lead 115 therefore rises so as to enable the limit circuits 12 and 13 to function in respect of the test selected by the appropriate push-button.

It will be realised therefore that by pressing one of the buttons associated with the switches 33 any particular test can be selected.

It will be understood that the apparatus described above may be used to test more than one parameter of an input signal, say pulse amplitude and frequency, and in that case the input signal is supplied over the appropriate lead 1 to two or more contacts of the switch bank S1 by way of attenuators that are associated one with each of these contacts as aforesaid.

For the purpose of testing the apparatus described above, it may be connected to a simulator that supplies "standard" signals instead of to a radar installation. Since it is desirable to ensure that the apparatus itself works within tolerances that are appreciably better than the tolerances of the radar installation, the check voltages supplied over the leads 14 and 15 are changed so as to represent reduced tolerances. With the exception of the 1% tolerances, the check voltages when testing the apparatus itself, represent tolerances that are approximately one-tenth of the normal values while the 1% tolerance is reduced somewhat less. The check voltages are changed in this manner by operation of changeover switches 121 and 122, from the positions shown in Figure 2, so as to connect resistors 123 to 126 in circuit. The resistance presented by each of the limit circuits 12 and 13 (shown as resistors 127 and 128) has a high value, say 2 megohms, while to provide the change stated the resistors 123 to 126 may have the following values:

| | Ohms |
|---|---|
| Resistor 123 | 120,000 |
| Resistor 124 | 13,330 |
| Resistor 125 | 60,000 |
| Resistor 126 | 6,660 |

Accordingly, for the purpose of testing the apparatus, the "standard" signals are supplied by the simulator and the apparatus performs its normal sequence of tests using the closer tolerance check voltages obtained by operation of the switches 121 and 122. The apparatus "tests" each "standard" signal and the sequence of tests continues, as when carrying out normal testing in the manner previously described, until such time as one of the "standard" signals lies outside the said chosen tolerance whereupon the testing automatically stops.

Since the said step-by-step electromagnetic switch has only twenty-five positions, the apparatus as so far described is only capable of carrying out twenty-five tests. This number of tests may however be increased by replacing the single switch by a plurality of similar switches together with a master switch which is arranged to feed the signals supplied by the wipers of any one of the plurality of switches to the appropriate parts of the apparatus.

Although the tests carried out by the apparatus, as described, are preset, it will be appreciated that these tests may be changed quite easily. Such a change would be necessary, for example, if the apparatus was to be used with a completely different radar installation. Assuming that the same parameters are to be tested and that therefore no additional converting means are required, it is necessary to change the cross-connections between the terminals 18 and 19 for the purpose of ensuring that the appropriate converting means 3 to 9 is brought into circuit for each new test. Similarly the check voltages are changed by changing, in the case of of the high limit tolerance, for example, the cross-connections between the terminals 24 and 25. Finally the attenuators 2 are varied so that the signals to be tested have the correct level at the contacts of the bank S1 of the switch and, for this purpose, the attenuators 2 are arranged to be variable. This last adjustment is made by supplying over each lead 1 in turn a "standard" signal, which may be supplied by a simulator as previously mentioned, corresponding to the signal that is supplied thereto during normal operation and then adjusting the attenuator 2, until the error indicating circuit 26 gives a zero reading.

The apparatus described above by way of example may be modified by replacing the control relays A to H by a further step-by-step switch. Contacts of a first contact bank of this further switch are connected to the terminals 19 respectively while the wiper 17 of the switch bank S2 is earthed, the further switch being arranged so that, when one of the terminals 19 is earthed through the switch bank S2, the further switch is caused to be stepped until the wiper of the first contact bank is in engagement with the appropriate contact of that bank to which the earthed terminal 19 is connected. Other banks of contacts of this further switch are arranged to connect the appropriate converting means 3 to 9 in circuit for each test.

I claim:

1. Apparatus for testing a group of electric signals which signals have, in the group, at least two different parameters to be tested, said apparatus comprising a plurality of input paths which carry the signals to be tested, a plurality of converting means which are less in number than the input paths and each of which operates to convert the value of a parameter of an electric signal supplied thereto into an electric test signal having a particular parameter the value of which is a measure of the said parameter of the signal supplied thereto, the said particular parameter being the same for all the converting means and the parameters of the electric signals converted thereby all being different, a test path, means selectively to set up a connection between any one of the input paths and the test path by way of one of the converting means so that when such a connection is established there is passed to the test path an electric test signal having a value of the said particular parameter which is a measure of the parameter of the signal under test carried by the appropriate input path, means to supply an electric check signal, means responsive to the value of the said particular parameter of the test signal on the test path lying to one side of a value signified by the said check signal, and means to vary the said check signal for the purpose of changing the tolerance limit from test to test.

2. Apparatus according to claim 1 wherein the said check signal is a measure of the low tolerance limit for each test.

3. Apparatus according to claim 1 wherein the said check signal is a measure of the high tolerance limit for each test.

4. Apparatus for testing a group of electric signals which signals have, in the group, at least two different parameters to be tested, said apparatus comprising a plurality of input paths which carry the signals to be tested, a plurality of converting means each of which operates to convert the value of a parameter of an electric signal supplied thereto into an electric test signal having a particular parameter the value of which is a measure of the said parameter of the signal supplied thereto, the said particular parameter being the same for all the converting means and the parameters of the electric signals converted thereby all being different, a test path, means selectively to set up a connection between any one of the input paths and the test path by way of one of the converting means so that when such a connection is established there is passed to the test path an electric test signal having a value of the said particular parameter which is a measure of the parameter of the signal under test carried by the appropriate input path, means to supply two electric check signals, and means responsive to the value of the said particular parameter of the test signal on the test path lying between the two values signified by the two check signals respectively.

5. Apparatus according to claim 4 wherein there is means to vary the said check signals for the purpose of changing the tolerance limits from test to test.

6. Apparatus according to claim 1 wherein at least one of the said converting means is arranged to be utilised for testing two or more signals of the said group.

7. Apparatus according to claim 1 wherein the said test signal is a direct current test signal having a nominal voltage that is predetermined.

8. Apparatus for testing a group of electric signals which have, in the group, at least two different parameters to be tested comprising a plurality of means which are arranged to change the levels of at least some of the electric signals forming the group to be tested and which are each associated with one test, a plurality of converting means which are less in number than the input paths and each of which operates to convert the value of a parameter of a signal of the said group after passing through the appropriate last mentioned means into a direct current test signal having a voltage the value of which is a measure of the said parameter, first switching means arranged selectively to connect the said plurality of converting means in circuit so as, during operation, to derive a test signal in respect of only one of the electric signals of the said group at a time, means to supply a first plurality of different check voltages, second switching means to select any one of the said first plurality of check voltages, means to supply a second plurality of different check voltages, third switching means to select any one of the said second plurality of check voltages, means to compare the test signal voltage with the two check voltages selected by the second and third switching means, and means responsive under the control of the last mentioned means to the test signal voltage being outside the voltage range the limits of which are equal to the two check voltages.

9. Apparatus according to claim 8 wherein the first switching means is arranged so that in respect of some of the signals of said group the test signal is obtained directly from the said level changing means.

10. Apparatus according to claim 8 wherein there is means to operate together the first, second and third switching means so that when the parameter of a particular signal of the said group is under test, the appropriate check voltages which are a measure of the low and high tolerance limits of the parameter are actomatically selected.

11. Apparatus according to claim 10 wherein the first, second and third switching means comprises different banks of a step-by-step electromagnetic switch.

12. Apparatus according to claim 8 wherein there is means to cause the first, second and third switching means to set up automatically the necessary connections for the next test after one test has been completed.

13. Apparatus according to claim 12 wherein the arrangement is such that the apparatus tests the whole group of electric signals sequentially at least until such time that one is found that lies outside its predetermined tolerance.

14. Apparatus according to claim 8 wherein there is means to cause the first, second and third switching means to set up the necessary connections to enable any particular test to be carried out.

15. Apparatus according to claim 8 wherein there is means to change the check voltages in respect of all the tests to be carried out by the apparatus, or at least those tests in which the tolerance limits are greatest, so that the tolerances represented by the check voltages are then reduced.

16. Apparatus according to claim 1 wherein the apparatus is arranged so that when making a test with at least one particular converting means the signal supplied to the said converting means is formed by a component having a parameter to be tested and a control component which is generated by the apparatus which itself has a different parameter with a value that is a measure of the nominal value of the said parameter to be tested, the said particular converting means being adapted so that the value of the said particular parameter of the test signal supplied thereby is dependent upon the difference between the actual value of the parameter being tested and the nominal value thereof as indicated by the said control component.

17. Apparatus according to claim 8 wherein the apparatus is arranged so that when making a test with at least one particular converting means the signal supplied to the converting means is formed by a component having the parameter to be tested and a direct current component which is generated by the apparatus and which has a voltage that is a measure of the nominal value of the said parameter to be tested, the said particular converting means being adapted so that the voltage of the test signal supplied hereby is dependent upon the difference between the actual value of the parameter being tested and the nominal value thereof as indicated by the voltage of the said direct current component.

18. Apparatus according to claim 1 wherein one of the said converting means is arranged to supply a test signal dependent upon the peak voltage of a signal supplied thereto.

19. Apparatus according to claim 1 wherein one of the said converting means is arranged to supply a test signal dependent on the R.M.S. voltage of a signal supplied thereto.

20. Apparatus according to claim 1 wherein one of the said converting means in arranged to supply a test signal dependent on the average voltage of a signal supplied thereto.

21. Apparatus according to claim 1 wherein one of the said converting means is arranged to supply a test signal dependent upon the frequency of a signal supplied thereto.

22. Apparatus according to claim 1 wherein one of the said converting means is arranged to supply a test signal dependent upon the amplitude of a pulse signal supplied thereto.

23. Apparatus according to claim 8 wherein there is provided means to time a period after the first, second and third switching means have set up the necessary connections for a test, the test being effected at the end of the said period.

24. Apparatus according to claim 23 wherein the said period is dependent upon the particular converting means connected in circuit.

References Cited in the file of this patent

UNITED STATES PATENTS

| | | |
|---|---|---|
| 2,468,398 | Griffin | Apr. 26, 1949 |
| 2,742,611 | Antos et al. | Apr. 17, 1956 |
| 2,776,405 | Moore et al. | Jan. 1, 1957 |
| 2,869,076 | Evans et al. | Jan. 13, 1959 |

FOREIGN PATENTS

| | | |
|---|---|---|
| 530,000 | Canada | Sept. 4, 1956 |